(12) United States Patent
Xu

(10) Patent No.: US 8,705,646 B1
(45) Date of Patent: Apr. 22, 2014

(54) MATRIX OPERATIONS FOR COMMUNICATIONS CHANNEL

(75) Inventor: Lei Xu, High Wycombe (GB)

(73) Assignee: Altera Corporation, San Jose, CA (US)

( * ) Notice: Subject to any disclaimer, the term of this patent is extended or adjusted under 35 U.S.C. 154(b) by 1258 days.

(21) Appl. No.: 12/557,909

(22) Filed: Sep. 11, 2009

(51) Int. Cl.
*H04B 7/02* (2006.01)
*G06F 7/52* (2006.01)

(52) U.S. Cl.
USPC .......................................... 375/267; 708/607

(58) Field of Classification Search
USPC .............. 375/267, 260, 259; 326/39; 708/607
See application file for complete search history.

(56) References Cited

U.S. PATENT DOCUMENTS

| | | | | |
|---|---|---|---|---|
| 7,629,902 | B2* | 12/2009 | Zhang et al. | 341/106 |
| 2007/0090973 | A1* | 4/2007 | Karlsson et al. | 340/995.22 |
| 2008/0303699 | A1* | 12/2008 | Zhang et al. | 341/67 |
| 2009/0295607 | A1* | 12/2009 | Au et al. | 341/67 |
| 2011/0032545 | A1* | 2/2011 | Mestha et al. | 358/1.9 |

* cited by examiner

*Primary Examiner* — Chieh M Fan
*Assistant Examiner* — Brian J Stevens
(74) *Attorney, Agent, or Firm* — Ropes & Gray LLP; Jeffrey H. Ingerman

(57) ABSTRACT

Matrix operations are simplified by precalculating and storing certain portions of the operation. This reduces the computational burden, while requiring a modest increase in memory usage. The operations may be performed in a Multiple-Input/Multiple-Output ("MIMO") configuration of an LTE system, where a number of equalizer functions require matrix operations such as derivation of a covariance matrix, which involves matrix multiplication, as do other operations. The operations may be performed on a programmable integrated circuit device configured for that purposes.

32 Claims, 5 Drawing Sheets

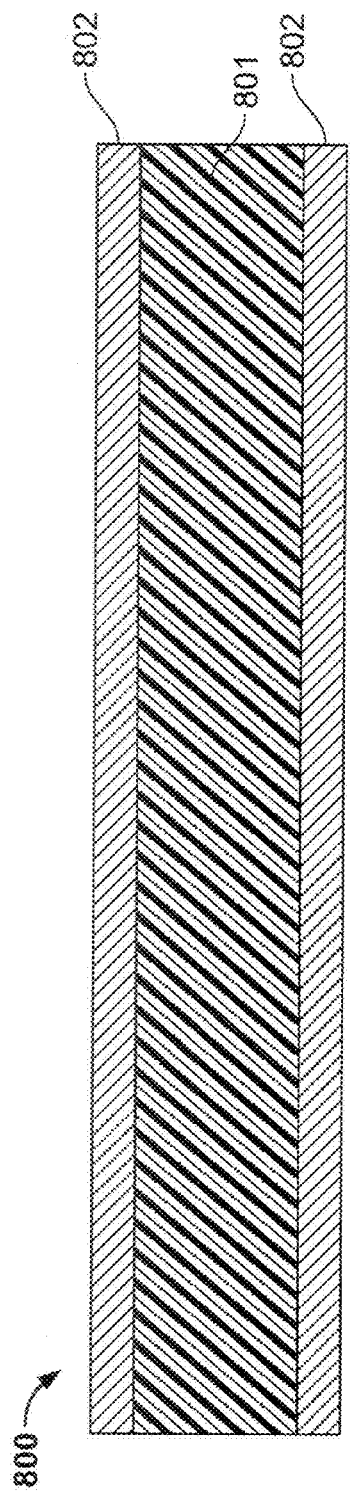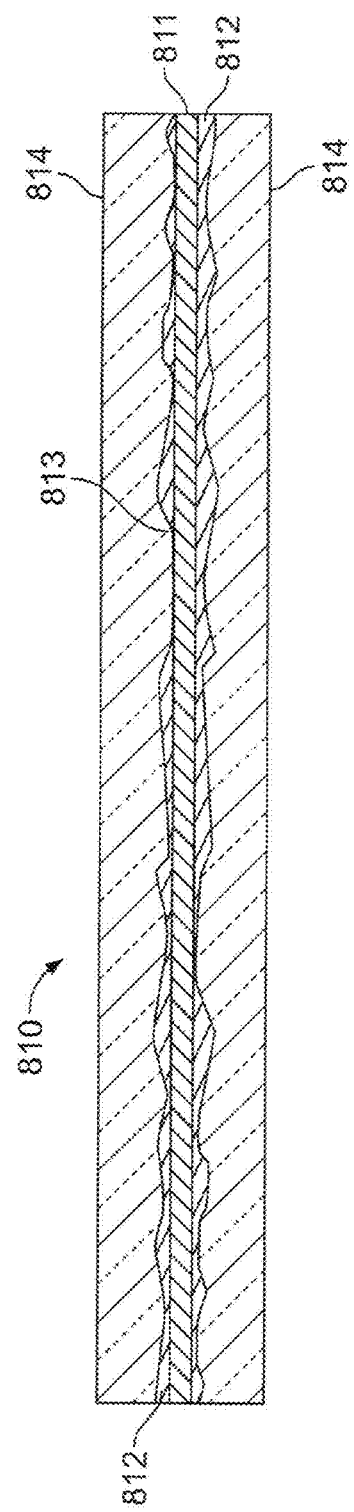

MATRIX OPERATIONS FOR COMMUNICATIONS CHANNEL

BACKGROUND OF THE INVENTION

This invention relates to performing matrix operations for a communications channel, and particularly to optimizing performance of those operations in integrated circuit devices, especially programmable integrated circuit devices such as programmable logic devices (PLDs).

In multicarrier communications such as the 3GPP Long Term Evolution ("LTE") improvement to the previous Universal Mobile Telecommunications System ("UMTS") standard for mobile telephony and Internet access, various functions are based on mathematical calculations involving matrix operations. While the computational load involved in performing such operations, which typically involve many multiplication operations, may be manageable on a general-purpose computing device, mobile telecommunications devices are, by their nature, more limited in their computational abilities. It may be difficult to provide the necessary computational capability in an integrated circuit device to allow a mobile telecommunications device to perform such operations. It may be even more difficult when the integrated circuit device is a programmable integrated circuit device, such as a programmable logic device (PLD), where the final configuration with which an end-user may program the device cannot be known with certainty at the time of manufacture.

SUMMARY OF THE INVENTION

The present invention relates to improvements in the performance of matrix operations in a wireless communication channel, such as in an LTE communication channel, which either can be implemented as circuitry in a fixed logic device, or can be configured into a programmable integrated circuit device such as a programmable logic device (PLD).

In a Multiple-Input/Multiple-Output ("MIMO") configuration according to the LTE scheme, a number of equalizer functions require matrix operations. For example, both zero-forcing and minimum-mean-square-error ("MMSE") equalizer processing involve derivation of a covariance matrix, which involves matrix multiplication. Similarly, channel estimation interpolation involves matrix multiplication. Matrix multiplication involves a large number of multiplication operations, which could quickly overwhelm the available multiplication capability that can be supported by an integrated circuit device. That is particularly the case where the device is a programmable integrated circuit device, whose precise end-use is not known at the time of fabrication, and which therefore will not necessarily include all of the multipliers that might be needed.

In accordance with the present invention, matrix operations are simplified by precalculating and storing certain portions of the operation. The stored portions may then be reused as needed. This reduces the computational burden, although it may introduce a modest increase in memory usage.

Therefore, in accordance with the present invention, there is provided matrix operation circuitry for performing operations to derive a desired matrix from a candidate input data symbol in a stream of input data symbols, where the stream includes pilot symbols other than the candidate data symbol. The matrix operation circuitry includes memory circuitry and dedicated processing circuitry that performs complex multiplication operations. The dedicated processing circuitry is linked to the memory circuitry. The dedicated processing circuitry performs complex multiplication operations on a matrix derived from one of the pilot symbols to produce at least one constant matrix. The dedicated processing circuitry stores that at least one constant matrix in the memory circuitry. The matrix operation circuitry retrieves that at least one constant matrix from the memory circuitry and operates on the at least one constant matrix and on parameters relating the candidate data symbol to the one of the pilot symbols, to obtain at least a precursor of the desired matrix.

A method of configuring such circuitry on a programmable device, a programmable device so configurable, and a machine-readable data storage medium encoded with software for performing the method, are also provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIG. 4 is a cross-sectional view of a magnetic data storage medium encoded with a set of machine-executable instructions for performing methods according to the present invention;

FIG. 5 is a cross-sectional view of an optically readable data storage medium encoded with a set of machine executable instructions for performing methods according to the present invention.

DETAILED DESCRIPTION OF THE INVENTION

Figure 1:
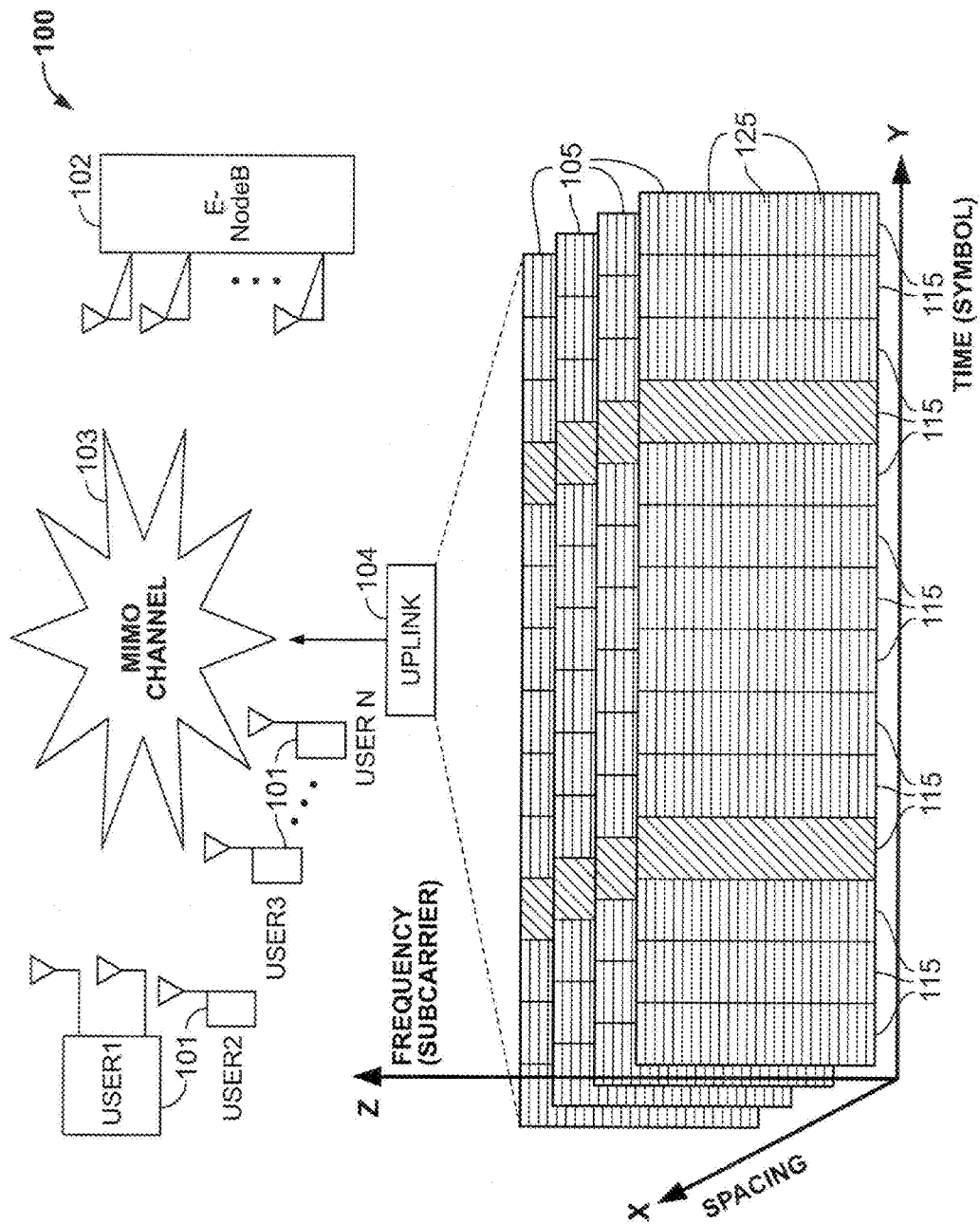
FIG. 1 shows an exemplary LTE MIMO system with which the present invention can be used.

In a MIMO system 100 as depicted in FIG. 1, a plurality of N user devices 101 may communicate with a base station 102 over channel 103. Communications in the uplink direction 104 (i.e., from a user device 101 to a base station 102) may be represented as a plurality of data streams 105, each having a plurality of temporally successive symbols 115 having components 125 spread over a plurality of subcarrier frequencies.

Figure 2:
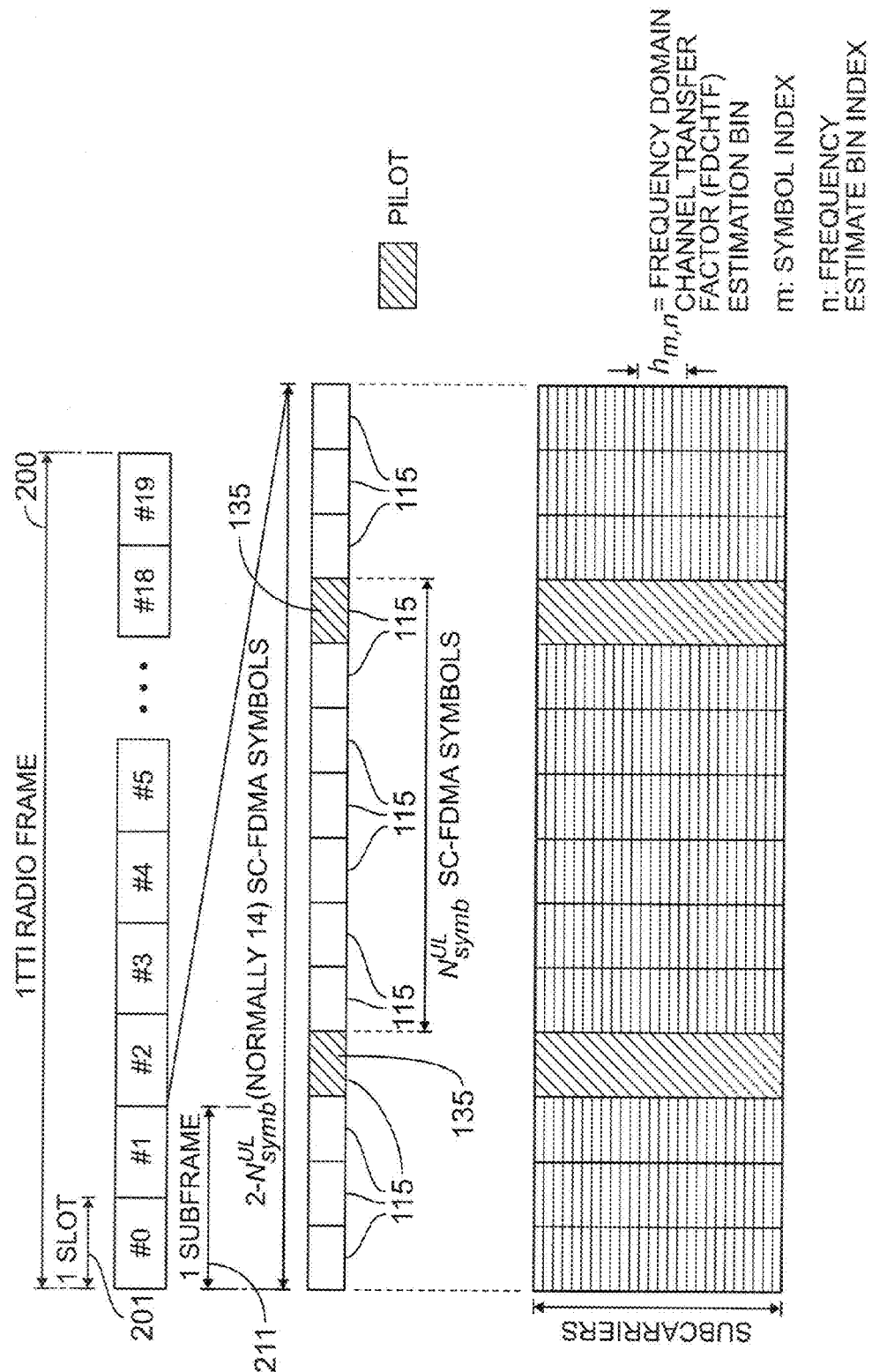
FIG. 2 shows the structure of an exemplary signal in a system such as the system of FIG. 1.

In an LTE system, each data stream 105 may be a Single-Carrier Frequency Division Multiple Access (SC-FDMA) stream that may be broken down into a plurality of frames 200 as diagrammed in FIG. 2. In the LTE Frequency Division Duplex mode, each frame 200 may include 20 temporal slots 201, divided into ten subframes 211, each of which includes two slots 201. $N^{UL}_{symb}$ symbols 115 (typically seven symbols) may be transmitted in each uplink slot 201, so that each subframe includes $2N^{UL}_{symb}$ symbols 115 (typically 14 symbols). One of the symbols in each LTE uplink slot 201 (i.e., two symbols in every LTE subframe 211) is referred to as a "pilot" symbol 135, which may be predetermined, and can be used to derive a channel estimate to enable decoding of data symbols 115 in the subframe.

A signal received at base station 102 may be decoded in accordance with a known transfer function:

$$y = Hx + n$$

where:
  x is the transmitted signal vector of the transmitter antennas;
  y is the received signal vector of the receiver antennas;
  n is Adaptive White Gaussian Noise vector observed at the receiver antennas (a 4×1 column vector); and
  H is the Frequency Domain Channel Transfer Function (FDCHTF) matrix, where H(i,j) denotes the element for the channel link between the jth transmit antenna and the ith receive antenna.

The known quantities are y, n and H, while x is the data symbol to be solved for.

One technique for estimating x is the closed-form MMSE solution, according to which the estimate $\bar{x}$ of the transmitted signal x may be expressed as:

$$\bar{x} = Wy$$

$$W = (H^H H + \delta_n I)^{-1} H^H = A^{-1} H^H$$

where W is a weighting matrix and A is defined to represent the covariance matrix:

$$A = (H^H H + \delta_n I). \qquad (1)$$

Accordingly, to calculate the weight matrix W, one determines and then inverts the covariance matrix A.

Normally, channel estimation of a data symbol may be derived by linear interpolation of a kth symbol from a pilot symbol p:

$$\hat{H}[k] = a\hat{H}[p] + b \cdot \hat{H}[p + N_{symb}^{UL}] \qquad (2)$$

where a and b are weighting factors.

As a first-order approximation, the channel estimate may be written as:

$$\hat{H}[k] = \hat{H}[p] + H_\Delta(k-p) \qquad (3)$$

where:

$$H_\Delta = \frac{\hat{H}[p + N_{symb}^{UL}] - \hat{H}[p]}{N_{symb}^{UL}}.$$

As a first simplified solution in accordance with an embodiment of the present invention, one may substitute Equation (2) into Equation (1):

$$A = H^H H + \delta_n I$$
$$= a^2[(H[p])^H H[p]] + b^2[(H[p + N_{symb}^{UL}])^H H([p + N_{symb}^{UL}])] +$$
$$ab[(H[p])^H H[p + N_{symb}^{UL}] + (H[p + N_{symb}^{UL}])^H H[p]]$$
$$= a^2 B + b^2 C + abD + \delta_n I$$

where:

$$B = [(H[p])^H H[p]]$$

$$C = [(H[p+N_{symb}^{UL}])^H H[p+N_{symb}^{UL}]]$$

$$D = [(H[p])^H H[p+N_{symb}^{UL}] + (H[p+N_{symb}^{UL}])^H H[p]].$$

As functions of the pilot symbol p and the number of symbols $N_{symb}^{UL}$, B, C and D are constant matrices which therefore need to be stored only once per subframe, and can be re-used for each data symbol in the subframe.

Moreover, each matrix B, C and D is a Hermitian, or self-adjoint, matrix—i.e., a square matrix with complex entries which is equal to its own conjugate transpose, meaning that element $a_{ij}$ is equal to the complex conjugate of element $a_{ji}$ for all i,j (if all $a_{ij}$ are real, that means that $a_{ij}=a_{ji}$). This means that only slightly over half the elements need to be stored, which conserves memory resources.

The benefit of this first simplified solution, which eliminates complex matrix multiplications from the calculation of A, may be seen from consideration of a scenario of a 4×4 MIMO system having seven symbols per slot, twelve subcarriers (1 resource block) assumed to have the same frequency estimate, and a 32-bit width used for the complex-valued frequency bin channel estimate element storage. If there are 100 resource blocks, ten elements of each Hermitian matrix B, C and D may be computed for each resource block and stored initially at a memory cost of 100×10×32×3=96 kb.

The straightforward calculation of covariance matrix A in such an example would use 100×(4×10)×12=48 k complex-by-complex operations per frame, while use of the first simplification according to the present invention would use 100×(4×10)×4=16 k complex-by-complex operations per frame and 100×(10×3)×12=36 k real-by-complex operations. This results in an equivalent savings of 48 k-(16 k+18 k)=14 k complex-by-complex operations per frame.

As a second simplified solution in accordance with an embodiment of the present invention, one may substitute Equation (3) into Equation (1):

$$A[k] = H^H H + \delta_n I$$
$$= [(H[p])^H H[p] + \delta_n I] + (k-p)^2[(H_\Delta)^H H_\Delta] +$$
$$(k-p)[(H_\Delta)^H H[p] + (H[p])^H H_\Delta]$$
$$= B + (k-p)^2 E + (k-p) F$$

where k is the symbol index and p is the first pilot symbol index, and:

$$B = [(H[p])^H H[p] + \delta_n];$$

$$E = [(H_\Delta)^H H_\Delta]; \text{ and}$$

$$F = [(H_\Delta)^H H[p] + (H[p])^H H_\Delta].$$

B, E (the gradient of the covariance) and F, like B, C and D above, are constant matrices which therefore need to be calculated and stored only once per subframe, and can be re-used for the channel estimate of each data symbol in the subframe. Like B, C and D above, B, E and F are Hermitian matrices, meaning that only slightly over half of the elements of the matrices need to be stored.

The benefit of this second simplified solution, which again eliminates complex matrix multiplications from the calculation of A, may be seen from consideration of a scenario of a 4×4 MIMO system having seven symbols per slot, twelve subcarriers (1 resource block) used as a frequency estimate bin, and a 32-bit width used for the complex-valued frequency bin channel estimate element storage. Ten elements of each 4×4 Hermitian matrix B, E and F are computed and stored initially at a memory cost of 100×10×32×3=96 kb.

The straightforward calculation of covariance matrix A in such an example would use 100×(4×10)×12=48 k complex-by-complex operations per subframe, while use of the second simplification according to the present invention would use 100×(4×10)×4=16 k complex-by-complex operations per subframe and 100×(10×2)×12=24 k real-by-complex operations. This results in an equivalent savings of 48 k-(16 k+12 k)=20 k complex-by-complex operations per subframe.

It will be recognized from the calculations above that the covariance matrix A is itself a Hermitian matrix that is a function of the symbol index k. Therefore, as a third simplified solution in accordance with an embodiment of the present invention, A may be calculated recursively as follows:

$$A[k+1] = H^H H + \delta_n I$$
$$= [(H[k])^H H[k] + \delta_n I] + (2k+1)[(H_\Delta)^H H_\Delta] +$$
$$[(H_\Delta)^H H[0] + (H[0])^H H_\Delta]$$
$$= A[k] + (2k+1)E + G$$

where:

$A[0]=(H[0])^H H[0]+\delta_n I$ for $k \geq 0$ $E=[(H_\Delta)^H H_\Delta]$; and $G=[(H_\Delta)^H H[0]+(H[0])^H H_\Delta]$.

E and G, like other matrices (including E) mentioned above, are constant matrices which therefore need to be calculated and stored only once per subframe, and can be re-used for the channel estimate of each data symbol in the subframe. Similarly, the A[0] matrix may be considered a constant matrix which need be computed only once for all k. Moreover, A[0], E and G are Hermitian matrices, so that only slightly over half the elements need to be stored.

The benefit of this third simplified solution, which again eliminates complex matrix multiplications from the calculation of A, may be seen from consideration of a scenario of a 4×4 MIMO system having seven symbols per slot, twelve subcarriers (1 resource block) used as a frequency estimate bin, and a 32-bit width used for the complex-valued frequency bin channel estimate element storage. Ten elements of each Hermitian matrix A[0], E and G are computed and stored initially at a memory cost of (100×10×32×2)+(100×10×24)= 88 kb.

The straightforward calculation of covariance matrix A in such an example would use 100×(4×10)×12=48 k complex-by-complex operations per subframe, while use of the third simplification according to the present invention would use 100×(4×10)×4=16 k complex-by-complex operations per subframe and 100×10×10=10 k real-by-complex operations. This results in an equivalent savings of 48 k-(16 k+5 k)=27 k complex-by-complex operations per subframe. Moreover, as a recursive operation, this third simplification is well-adapted for implementation in hardware.

As a fourth simplified solution in accordance with an embodiment of the present invention, one can calculate A using a different recursive calculation:

$A[k+1]=H^H H+\delta_n I=A[k]+J[k]$ $J[k+1]=J[k]+E<<1$, for $k \geq 0$ where:

$J[0]=[E+(H_\Delta)^H H[0]+(H[0])^H H_\Delta]$ $A[0]=(H[0])^H H[0]+\delta_n I$ $E=(H_\Delta)^H H_\Delta$.

and E<<1 signifies a left-shift of E by one bit.

J[0] and A[0], like other matrices (including E<<1) mentioned above, are constant matrices which therefore need to be calculated and stored only once per subframe, and can be re-used for the channel estimate of each data symbol in the subframe. Moreover, J[0], A[0] and E<<1 are Hermitian matrices, so that only slightly over half the elements need to be stored.

In this fourth simplification, which again eliminates complex matrix multiplications from the calculation of A, and in which even a multiplication-by-two is eliminated in favor of a left-shifting operation, may be seen from consideration of a scenario of a 4×4 MIMO system having seven symbols per slot, twelve subcarriers (1 resource block) used as a frequency estimate bin, a 32-bit width used for the complex-valued frequency bin channel estimate element storage, and a 24-bit width used for the gradient matrix E storage. Ten elements of each Hermitian matrix J[0] and A[0] are computed and stored initially at a memory cost of (100×10×32×2)+(100×10×24)= 88 kb.

The straightforward calculation of covariance matrix A in such an example would use 100×(4×10)×12=48 k complex-by-complex operations per subframe, while use of the fourth simplification according to the present invention would use 100×(4×10)×4=16 k complex-by-complex operations per subframe. This results in an equivalent savings of 48 k-16 k=32 k complex-by-complex operations per subframe. Moreover, as a recursive operation in which multiplications are further eliminated in favor of shifting operations, this fourth simplification is well-adapted for implementation in hardware.

As a fifth simplified solution in accordance with an embodiment of the present invention, one can calculate A using a further simplified initialization of the recursive calculation:

$A[k+1]=H^H H+\delta_n I=A[k]+J[k]$ $J[k+1]=J[k]+E<<1$, for $k \geq 1$ where:

$J[0]=A[1]-A[0]$ $A[0]=(H[0])^H H[0]+\delta_n I$ $A[1]=(H[1])^H H[1]+\delta_n I$ $E=(H_\Delta)^H H_\Delta$.

In this fifth simplified solution, matrix multiplication is not necessary for the calculation of J[0]. Instead, A[0] of Symbol 0 and A[1] of Symbol 1 are calculated based on H[0] and H[0], respectively. Subsequently, A[1] and A[0] are used to calculate J[0], which is stored in the memory that had stored A[0], which is no longer needed. Symbol k+1, k≥1, may be calculated from A[k], J[k] and E. Again, ten elements of each of three Hermitian matrices are computed and stored initially at a memory cost of (100×10×32×2)+(100×10×24)=88 kb.

The straightforward calculation of covariance matrix A in such an example would use 100×(4×10)×12=48 k complex-by-complex operations per subframe, while use of the fifth simplification according to the present invention would use 100×(4×10)×3=12 k complex-by-complex operations per subframe. This results in an equivalent savings of 48 k-12 k=36 k complex-by-complex operations per subframe. Moreover, as a recursive operation in which multiplications are further eliminated in favor of shifting operations, this fifth simplification is well-adapted for implementation in hardware.

As seen, all five of the foregoing approaches are capable of achieving significant reduction in computational complexity at the cost of only a modestly increased memory requirement. Moreover, by converting many multiplication operations to addition operations, these approaches provide flexibility and efficiency in processor and memory usage. For example, in programmable logic devices available from Altera Corporation, of San Jose, Calif., which provide both a hard or soft processor, as well as dedicated DSP blocks containing multipliers, the processor can also be employed for the addition operation rather than remaining idle while the DSP blocks are busy performing multiplication operations.

And as at least partially indicated above, in at least the fourth and fifth approaches, recursive operations can be pipelined in hardware, reducing latency.

Alternatively, higher resolution equalization can be performed—such as per subcarrier rather than per resource block—because of the increased efficiency of the matrix operations.

As stated above, according to the closed-form MMSE solution, the estimate $\bar{x}$ of the transmitted signal x may be expressed as $$\bar{x} = A^{-1}H^H y.$$

Thus, after deriving A, one must invert A, which normally involves a complicated technique such as Cholesky decomposition. However, in accordance with a further aspect of the invention, in the case of a two-transmitter/two-receiver MIMO system, where A is a two-by-two matrix, a simplified direct calculation may be used.

If $$A = \begin{bmatrix} a & b \\ c & d \end{bmatrix},$$

then $$A^{-1} = \frac{1}{|A|}\begin{bmatrix} d & -b \\ -c & a \end{bmatrix}.$$

If one defines a new matrix $$\Psi(A) = \begin{bmatrix} d & -b \\ -c & a \end{bmatrix},$$

derived by reflecting matrix A about its minor diagonal and negating elements of the reflected matrix on its main diagonal, then $$A^{-1} = \frac{1}{|A|}\Psi(A) = \frac{1}{ad-bc}\begin{bmatrix} d & -b \\ -c & a \end{bmatrix},$$

and $$\Psi(I) = \begin{bmatrix} 1 & 0 \\ 0 & 1 \end{bmatrix} = I.$$

It can also be seen that $$|\Psi(A)| = da - (-b)*(-c) = ad - dc = |A|,$$

from which it follows that $$A^{-1} = \frac{1}{|\Psi(A)|}\Psi(A),$$

meaning that the calculation of the inverted two-by-two covariance matrix $A^{-1}$ in the two-by-two case effectively becomes a calculation of $\Psi(A)$. And because of the relationship between $\Psi(A)$ and A, that simply involves the substitution in any of the aforementioned techniques of $\Psi(U)$ for any vector expression U. Thus, in the fifth simplification, for example, instead of computing $$A[k+1] = H^H H + \delta_n I = A[k] + J[k]$$

$$J[k+1] = J[k] + E << 1, \text{ for } k \geq 1$$

where:

$$J[0] = A[1] - A[0]$$

$$A[0] = (H[0])^H H[0] + \delta_n I$$

$$A[1] = (H[1])^H H[1] + \delta_n I$$

$$E = (H_\Delta)^H H_\Delta,$$

and then inverting A using further matrix processing, one can compute $$\Psi(A[k+1]) = \Psi(H^H H + \delta_n I) = \Psi(A[k]) + J[k]$$

$$J[k+1] = J[k] + E << 1, \text{ for } k \geq 1$$

where:

$$J[0] = \Psi(A[1]) - \Psi(A[0])$$

$$\Psi(A[0]) = \Psi((H[0])^H H[0] + \delta_n I$$

$$\Psi(A[1]) = \Psi((H[1])^H H[1] + \delta_n I$$

$$E = \Psi((H_\Delta)^H H_\Delta),$$

from which $$\frac{1}{|\Psi(A)|},$$

and therefore $A^{-1}$, are easily computed directly. Any of the other aforementioned techniques also can be used to calculate $A^{-1}$ in this way.

The aforementioned techniques also can be used to interpolate data symbols. Each channel estimate of the frequency bins for the mth symbol can be expressed as a matrix H[m]. Assuming that the Frequency Domain Channel Transfer Function (FDCHTF) estimates $\hat{H}[p]$ and $\hat{H}[p+N_{symb}^{UL}]$ of the frequency bins for two adjacent pilots are available, then the channel FDCHTF estimate of the frequency bins for another data symbol can be generated using time-domain linear interpolation.

As before, the linear interpolation may be given by:

$$\hat{H} = a\hat{H}[p] + b\cdot\hat{H}[p+N_{symb}^{UL}]$$

And again, as a first-order approximation, one may write:

$$\hat{H}[k] = \hat{H}[p] + \hat{H}_\Delta(k-p)$$

where:

$$\hat{H}_\Delta = \frac{\hat{H}[p + N_{symb}^{UL}] - \hat{H}[p]}{N_{symb}^{UL}}$$

is the gradient matrix. If one also defines an initial matrix:

$$\hat{H}_0 = \hat{H}[p] - \hat{H}_\Delta$$

then the result is:

$$\hat{H}[k] = \hat{H}_0 + k\hat{H}_\Delta$$

or $$\hat{H}[k] = \hat{H}[k-1] + \hat{H}_\Delta.$$

The processing sequence of channel estimate for data symbols is from 0 to k. Therefore, recursive operations can be defined as follows:

$$\hat{H}[k] = \hat{H}[k-1] + \hat{H}_\Delta$$

where the (k−1)th symbol is not a pilot. Where the (k−1)th symbol is a pilot, $$\hat{H}[k] = \hat{H}[k-2] + \hat{H}_\Delta \ll 1$$

(because it is not necessary to compute the pilot, so it can be skipped). The left-shift replaces a multiplication-by-two to further reduce complexity, although if there are multipliers to spare, the multiplication option may be used.

Channel estimates for data symbols can therefore be computed by storing only two matrices $\hat{H}[k]$ and $\hat{H}_\Delta$, rather than having to store three matrices $\hat{H}[k]$, $\hat{H}[p]$ and $\hat{H}[p+N_{symb}^{UL}]$. Except for computing $\hat{H}_0$, only one complex matrix addition is used. Further, reducing multiplication operations both reduces latency and improves accuracy.

One potential use for the present invention may be in programmable integrated circuit devices such as programmable logic devices, where programming software can be provided to allow users to configure a programmable device to perform matrix operations. The result would be that fewer logic resources of the programmable device would be consumed. And where the programmable device is provided with a certain number of dedicated blocks for arithmetic functions (to spare the user from having to configure arithmetic functions from general-purpose logic), the number of dedicated blocks needed to be provided (which may be provided at the expense of additional general-purpose logic) can be reduced (or sufficient dedicated blocks for more operations, without further reducing the amount of general-purpose logic, can be provided).

Figure 3:
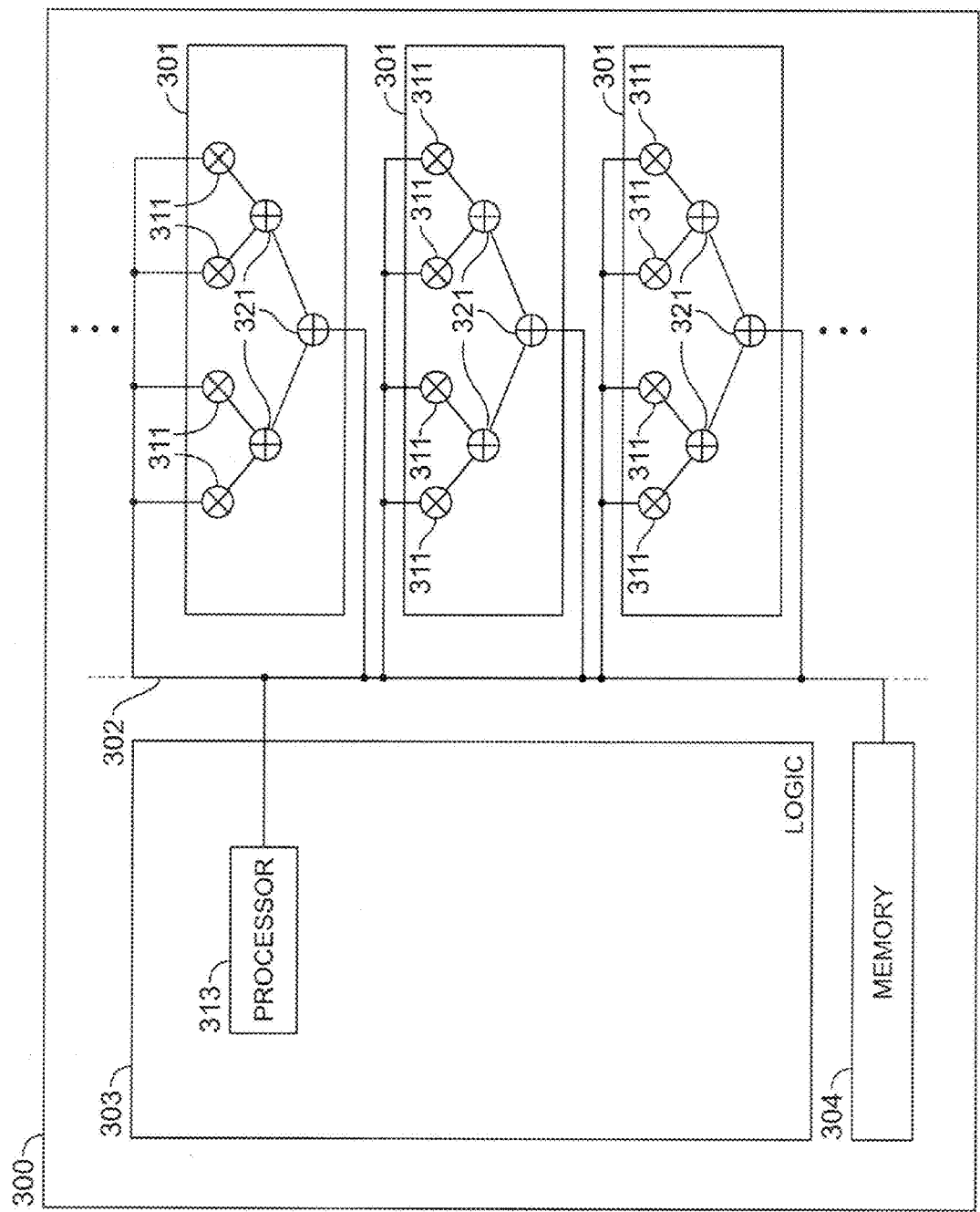
FIG. 3 shows an example of circuitry for performing methods according to the present invention.

An example of circuitry for performing methods according to the invention is shown in FIG. 3. Circuitry 300 may be fixed circuitry, or may be circuitry in a programmable device as discussed above, such as a programmable logic device from the STRATIX® family of FPGAs, available from Altera Corporation. As discussed above, circuitry 300 may have a plurality of DSP blocks 301 each including a plurality of multipliers 311 and adders 321. DSP blocks 301 may be chained as by bus 302 to make large numbers of multipliers 311 and adders 321 available to perform the various matrix operations described above. Circuitry 300 may also have other logic 303 which, in the case of a programmable device, may be programmable general-purpose logic, which also may be configured to perform some of the required operations. Logic 303 also may include processor 313, which could be a dedicated processor or, in a programmable device, could be a "soft" processor configured from logic 303. Processor 313, whether fixed or soft, could be used in at least the manner described above to perform matrix operations. Circuitry 300 also may include memory 304 accessible to logic 303 and/or to processor 313 and/or to DSP blocks 302. In implementing the techniques described above, memory 304 may be used to store the various "constant" matrices that are calculated once but used many times.

Instructions for carrying out a method according to this invention for programming a programmable device to perform matrix operations may be encoded on a machine-readable medium, to be executed by a suitable computer or similar device to implement the method of the invention for programming or configuring PLDs or other programmable devices to perform addition and subtraction operations as described above. For example, a personal computer may be equipped with an interface to which a PLD can be connected, and the personal computer can be used by a user to program the PLD using a suitable software tool, such as the QUARTUS® II software available from Altera Corporation, of San Jose, Calif.

FIG. 4 presents a cross section of a magnetic data storage medium 800 which can be encoded with a machine executable program that can be carried out by systems such as the aforementioned personal computer, or other computer or similar device. Medium 800 can be a floppy diskette or hard disk, or magnetic tape, having a suitable substrate 801, which may be conventional, and a suitable coating 802, which may be conventional, on one or both sides, containing magnetic domains (not visible) whose polarity or orientation can be altered magnetically. Except in the case where it is magnetic tape, medium 800 may also have an opening (not shown) for receiving the spindle of a disk drive or other data storage device.

The magnetic domains of coating 802 of medium 800 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

FIG. 5 shows a cross section of an optically-readable data storage medium 810 which also can be encoded with such a machine-executable program, which can be carried out by systems such as the aforementioned personal computer, or other computer or similar device. Medium 810 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 810 preferably has a suitable substrate 811, which may be conventional, and a suitable coating 812, which may be conventional, usually on one or both sides of substrate 811.

In the case of a CD-based or DVD-based medium, as is well known, coating 812 is reflective and is impressed with a plurality of pits 813, arranged on one or more layers, to encode the machine-executable program. The arrangement of pits is read by reflecting laser light off the surface of coating 812. A protective coating 814, which preferably is substantially transparent, is provided on top of coating 812.

In the case of magneto-optical disk, as is well known, coating 812 has no pits 813, but has a plurality of magnetic domains whose polarity or orientation can be changed magnetically when heated above a certain temperature, as by a laser (not shown). The orientation of the domains can be read by measuring the polarization of laser light reflected from coating 812. The arrangement of the domains encodes the program as described above.

Figure 6:
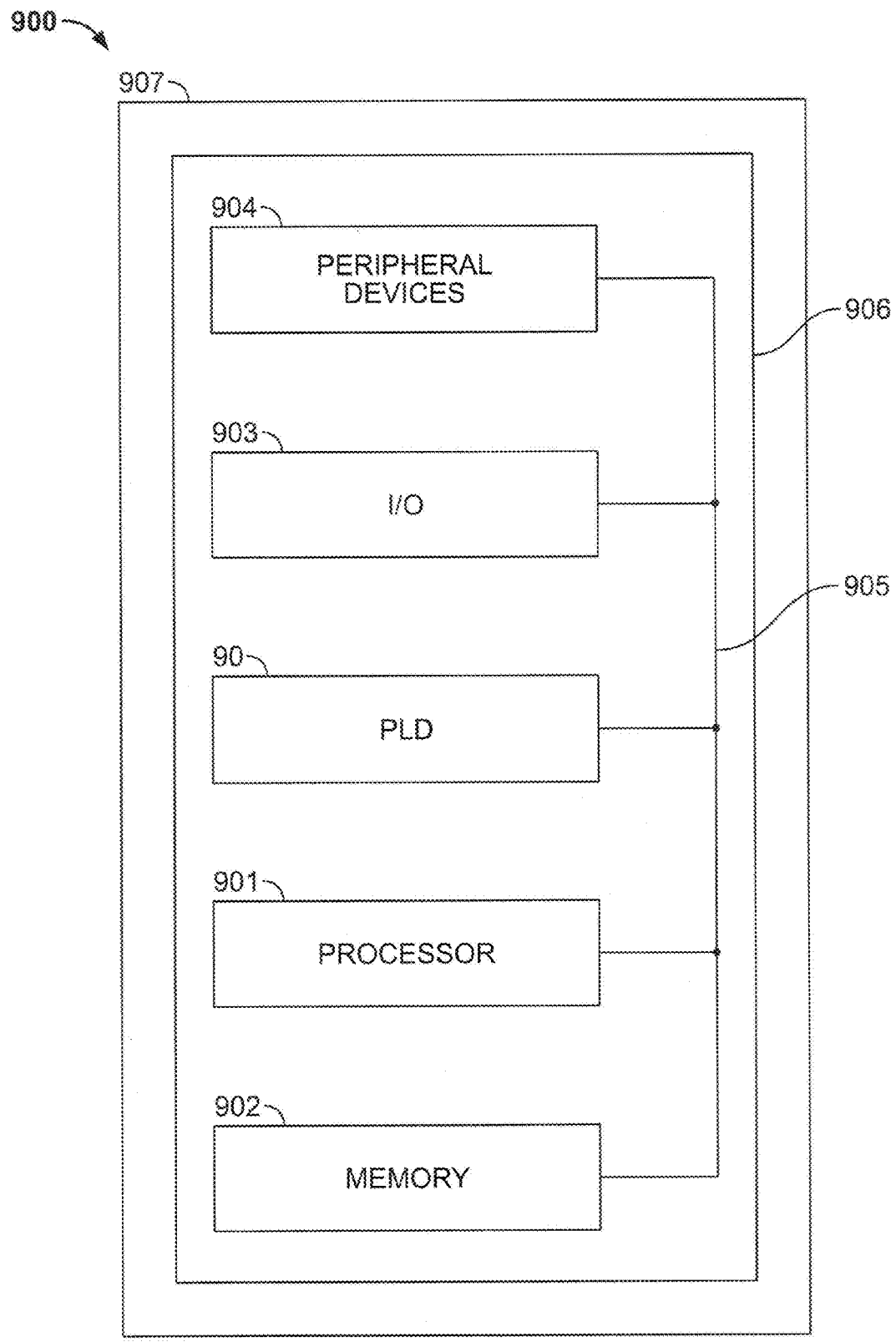
FIG. 6 is a simplified block diagram of an illustrative system employing a programmable logic device incorporating the present invention.

A PLD 90 programmed according to the present invention may be used in many kinds of electronic devices. One possible use is in a data processing system 900 shown in FIG. 6. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as wireless transceivers, computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Matrix operation circuitry for performing operations to obtain an inverted covariance matrix from a candidate input data symbol in a stream of input data symbols, said stream including pilot symbols other than said candidate data symbol, said matrix operation circuitry comprising:
   memory circuitry; and
   dedicated processing circuitry that performs complex multiplication operations, said dedicated processing circuitry being linked to said memory circuitry; wherein:
   said dedicated processing circuitry performs complex multiplication operations on a matrix derived from one of said pilot symbols to produce at least one constant matrix;
   said dedicated processing circuitry stores said at least one constant matrix in said memory circuitry;
   said matrix operation circuitry retrieves said at least one constant matrix from said memory circuitry and operates on said at least one constant matrix and on parameters relating said candidate data symbol to said one of said pilot symbols, by performing additional complex multiplication operations in said dedicated processing circuitry, to obtain at least said covariance matrix.

2. The matrix operation circuitry of claim 1 wherein:
   said matrix operation circuitry is part of a MIMO transceiver system.

3. The matrix operation circuitry of claim 1 wherein:
   said matrix operation circuitry is part of a MIMO transceiver system having a two-by-two covariance matrix;
   said inverted covariance matrix is an inverse of said two-by-two covariance matrix; and
   said matrix operation circuitry obtains said inverse of said two-by-two covariance matrix by operating on matrices defined by reflecting each of said derived matrix and said at least one constant matrix about its respective minor diagonal and negating elements each of said reflected derived matrix and said at least one reflected constant matrix on its respective main diagonal.

4. The matrix operation circuitry of claim 1 wherein:
   said matrix operation circuitry operates on said at least one constant matrix and on said parameters by performing recursive operations.

5. The matrix operation circuitry of claim 4 wherein:
   said recursive operations include addition/subtraction operations and said additional complex multiplication operations.

6. The matrix operation circuitry of claim 5 further comprising:
   processor circuitry; wherein:
   said addition/subtraction operations are performed by said processor circuitry.

7. The matrix operation circuitry of claim 6 wherein said processor circuitry is a dedicated processor.

8. The matrix operation circuitry of claim 6 wherein said processor circuitry is configured from programmable logic.

9. A programmable integrated circuit device configured as matrix operation circuitry for performing operations to obtain an inverted covariance matrix from a candidate input data symbol in a stream of input data symbols, said stream including pilot symbols other than said candidate data symbol, said configured programmable integrated circuit device comprising:
   memory circuitry; and
   dedicated processing circuitry configured to perform complex multiplication operations, and to be linked to said memory circuitry; wherein:
   said dedicated processing circuitry is configured to perform complex multiplication operations on a matrix derived from one of said pilot symbols to produce at least one constant matrix;
   said dedicated processing circuitry is configured to store said at least one constant matrix in said memory circuitry;
   said matrix operation circuitry is configured to retrieve said at least one constant matrix from said memory circuitry and to operate on said at least one constant matrix and on parameters relating said candidate data symbol to said one of said pilot symbols, by performing additional complex multiplication operations in said dedicated processing circuitry, to obtain at least said covariance matrix.

10. The programmable integrated circuit device of claim 9 wherein:
    said matrix operation circuitry is part of a MIMO transceiver system.

11. The programmable integrated circuit device of claim 9 wherein:
    said matrix operation circuitry is part of a MIMO transceiver system having a two-by-two covariance matrix;
    said inverted covariance matrix is an inverse of said two-by-two covariance matrix; and
    said matrix operation circuitry is configured to obtain said inverted two-by-two covariance matrix by operating on matrices defined by reflecting each of said derived matrix and said at least one constant matrix about its respective minor diagonal and negating elements each of said reflected derived matrix and said at least one reflected constant matrix on its respective main diagonal.

12. The programmable integrated circuit device of claim 9 wherein:
said matrix operation circuitry is configured to operate on said at least one constant matrix and on said parameters by performing recursive operations.

13. The programmable integrated circuit device of claim 12 wherein:
said recursive operations include addition/subtraction operations and said additional complex multiplication operations.

14. The programmable integrated circuit device of claim 13 further comprising:
processor circuitry; wherein:
said processor circuitry is configured to perform said addition/subtraction operations.

15. The programmable integrated circuit device of claim 14 wherein said processor circuitry is a dedicated processor.

16. The programmable integrated circuit device of claim 14 wherein said processor circuitry is configured from programmable logic.

17. A method of configuring a programmable integrated circuit device as matrix operation circuitry for performing operations to obtain an inverted covariance matrix from a candidate input data symbol in a stream of input data symbols, said stream including pilot symbols other than said candidate data symbol, said method comprising:
configuring a link of dedicated processing circuitry to memory circuitry; and
configuring dedicated processing circuitry to perform complex multiplication operations by:
configuring said dedicated processing circuitry to perform complex multiplication operations on a matrix derived from one of said pilot symbols to produce at least one constant matrix,
configuring said dedicated processing circuitry to store said at least one constant matrix in said memory circuitry, and
configuring said matrix operation circuitry to retrieve said at least one constant matrix from said memory circuitry and to operate on said at least one constant matrix and on parameters relating said candidate data symbol to said one of said pilot symbols, by performing additional complex multiplication operations in said dedicated processing circuitry, to obtain at least said covariance matrix.

18. The method of claim 17 wherein:
said matrix operation circuitry is part of a MIMO transceiver system.

19. The method of claim 17 wherein:
said matrix operation circuitry is part of a MIMO transceiver system having a two-by-two covariance matrix;
said inverted covariance matrix is an inverse of said two-by-two covariance matrix; said method comprising:
configuring said matrix operation circuitry to obtain said inverted two-by-two covariance matrix by operating on matrices defined by reflecting each of said derived matrix and said at least one constant matrix about its respective minor diagonal and negating elements each of said reflected derived matrix and said at least one reflected constant matrix on its respective main diagonal.

20. The method of claim 17 comprising:
configuring said matrix operation circuitry to operate on said at least one constant matrix and on said parameters by performing recursive operations.

21. The method of claim 20 wherein:
said recursive operations include addition/subtraction operations and said additional complex multiplication operations.

22. The method of claim 21 wherein said programmable integrated circuit device comprises:
processor circuitry; said method comprising:
configuring said processor circuitry to perform said addition/subtraction operations.

23. The method of claim 22 wherein said configuring said processor circuitry to perform said addition/subtraction operations comprises configuring a dedicated processor.

24. The method of claim 22 comprising configuring said processor circuitry from programmable logic.

25. A non-transitory machine-readable data storage medium encoded with machine-executable instructions for configuring a programmable integrated circuit device as matrix operation circuitry for performing operations to obtain an inverted covariance matrix from a candidate input data symbol in a stream of input data symbols, said stream including pilot symbols other than said candidate data symbol, said instructions comprising:
instructions to configure a link of dedicated processing circuitry to memory circuitry; and
instructions to configure dedicated processing circuitry to perform complex multiplication operations by:
configuring said dedicated processing circuitry to perform complex multiplication operations on a matrix derived from one of said pilot symbols to produce at least one constant matrix,
configuring said dedicated processing circuitry to store said at least one constant matrix in said memory circuitry, and
configuring said matrix operation circuitry to retrieve said at least one constant matrix from said memory circuitry and to operate on said at least one constant matrix and on parameters relating said candidate data symbol to said one of said pilot symbols, by performing additional complex multiplication operations in said dedicated processing circuitry, to obtain at least said covariance matrix.

26. The non-transitory machine-readable data storage medium of claim 25 wherein:
said matrix operation circuitry is part of a MIMO transceiver system.

27. The non-transitory machine-readable data storage medium of claim 25 wherein:
said matrix operation circuitry is part of a MIMO transceiver system having a two-by-two covariance matrix;
said inverted covariance matrix is an inverse of said two-by-two covariance matrix; said instructions comprising:
instructions to configure said matrix operation circuitry to obtain said inverted two-by-two covariance matrix by operating on matrices defined by reflecting each of said derived matrix and said at least one constant matrix about its respective minor diagonal and negating elements each of said reflected derived matrix and said at least one reflected constant matrix on its respective main diagonal.

28. The non-transitory machine-readable data storage medium of claim 25 comprising:

instructions to configure said matrix operation circuitry to operate on said at least one constant matrix and on said parameters by performing recursive operations.

29. The non-transitory machine-readable data storage medium of claim 28 wherein:
said recursive operations include addition/subtraction operations and said additional complex multiplication operations.

30. The non-transitory machine-readable data storage medium of claim 29 wherein said programmable integrated circuit device comprises:
processor circuitry; said instructions comprising:
instructions to configure said processor circuitry to perform said addition/subtraction operations.

31. The non-transitory machine-readable data storage medium of claim 30 wherein said instructions to configure said processor circuitry to perform said addition/subtraction operations comprise instructions to configure a dedicated processor.

32. The non-transitory machine-readable data storage medium of claim 30 comprising instructions to configure said processor circuitry from programmable logic.

\* \* \* \* \*